(12) United States Patent
Airoldi et al.

(10) Patent No.: US 6,923,230 B2
(45) Date of Patent: Aug. 2, 2005

(54) ADAPTER FOR FASTENING SNOW CHAINS TO VEHICLE WHEELS

(75) Inventors: Romolo Airoldi, Lecco (IT); Marco Arrigoni Neri, Ballabio (IT)

(73) Assignee: Konig SpA, Molteno (IT)

( * ) Notice: Subject to any disclaimer, the term of this patent is extended or adjusted under 35 U.S.C. 154(b) by 30 days.

(21) Appl. No.: 10/460,204

(22) Filed: Jun. 13, 2003

(65) Prior Publication Data

US 2004/0000363 A1 Jan. 1, 2004

(30) Foreign Application Priority Data

Jun. 27, 2002 (EP) .............................. 02425425

(51) Int. Cl.$^7$ ............................................ B60C 27/00
(52) U.S. Cl. ...................... 152/170; 152/185; 152/216; 301/37.371; 301/37.374; 411/372.6; 411/431; 411/910
(58) Field of Search ..................... 301/37.101, 37.102, 301/37.371, 37.374, 37.375, 37.373; 152/170, 185, 181, 213 R, 216, 225 R, 237; 411/431, 372.5, 372.6, 373, 377, 427, 429, 910

(56) References Cited

U.S. PATENT DOCUMENTS 5,785,783 A 7/1998 Thioliere

FOREIGN PATENT DOCUMENTS

DE 39 10669 10/1990
EP 1 160 103 12/2001

*Primary Examiner*—Russell D. Stormer
(74) *Attorney, Agent, or Firm*—Nixon & Vanderhye, P.C.

(57) ABSTRACT

To fasten snow chains to vehicle wheels, an adapter device (100; 200; 300; 400) is used that can be fastened to at least one wheel bolt and comprises a body that is constructed to be connected to connection and installation elements of the snow chains. The adapter device comprises at least one magnet (120; 403) connected to its body which is applied to the head (130) of at least one wheel mounting bolt, so as to retain the body of the adapter device on the wheel by means of magnetic retention.

15 Claims, 6 Drawing Sheets

ADAPTER FOR FASTENING SNOW CHAINS TO VEHICLE WHEELS

BACKGROUND OF THE INVENTION

The present invention refers to an adapter for fastening snow chains to vehicle wheels.

A type of snow chain is currently know on the market comprising various sections of chain closed in a loop and disposed on the tread of the tire of the vehicle wheel. The sections of chain are connected to arms or spokes disposed radially on the outside of the wheel and ending in a box or disc-shaped plate designed to be disposed substantially coaxially to the wheel hub. The disc-shaped plate is fixed to the wheel by means of an adapter device which grips the head of at least one of the wheel mounting bolts.

Adapter devices are known on the market in the form of a cylindrical sleeve provided with an operating ring nut, rotation whereof operates the teeth for tightening to the head of the wheel bolt. Said operating ring nut is disposed on the outside of the sleeve to be able to be operated in rotation by the user, possibly with the aid of a special key, such as for example the hexagonal key used for fitting/removing the wheels of the vehicle.

The adapter device can have a transverse hole to receive a bar connected to the disc-shaped plate of the arms of the snow chains, or other fastening devices, such as a transverse lever with an end hold, which is disposed more or less in the centre of the rim.

Other types of adapter devices are known which comprise a disc-shaped late provided with mechanical clamping devices which grip all the bolts of a wheel.

It is obvious that the adapter devices according to the prior art have drawbacks due to the complexity of their installation and removal. In fact the installation and removal operation of the adapter devices proves awkward, long, troublesome and sometimes requires the use of special tools.

SUMMARY OF THE INVENTION

The object of the present invention is to eliminate the drawbacks of the prior art by providing an adapter device for fastening snow chains to vehicle wheels that is able to simplify the operation for installation thereof and reduce the time required for the installation operation.

Another object of the present invention is to provide such an adapter device that is versatile and able to adapt to various types of wheels and snow chains.

Another object of the present invention is to provide such an adapter device that is extremely reliable, safe and able to ensure a good grip of the snow chain to the wheel of the vehicle.

Another object of the present invention is to provide such an adapter device that is inexpensive and simple to make.

For fastening snow chains to the wheels of vehicles, an adapter device is used that is fixed to the head of a bolt of a vehicle wheel. The adapter device comprises a body that is constructed to be connected to connection and installation elements of snow chains.

The main characteristic of the invention is represented by the fact that the adapter device comprises magnetic means connected to the body of the adapter device and able to grip the head of at least one wheel bolt. In this manner, the body of the adapter device is firmly retained on the wheel by magnetic retention between the magnetic means and the head of the wheel bolt, which is metal.

It is evident that such an adapter device allows simple and immediate installation, without the aid of special tools. In fact for installation it is sufficient to apply the adapter device to the bolt/bolts of the wheel and for removal it is sufficient to pull the adapter device manually to overcome the magnetic retention action.

BRIEF DESCRIPTION OF THE DRAWINGS

Further characteristics of the invention will be made clearer by the detailed description that follows, referring to purely exemplary and therefore non-limiting embodiments thereof, illustrated in the appended drawings, wherein.

DESCRIPTION OF THE PREFERRED EMBODIMENTS

The adapter device according to the invention is described with the aid of the figures. Like reference numerals indicate like or corresponding elements and detailed description thereof will therefore be omitted.

A first embodiment of an adapter device according to the invention, designated as a whole by reference numeral 100, is described with reference to FIGS. 1–4. The adapter device 100 comprises a body 101 having substantially a hexagonal nut shape. The body 101 is hollow on the inside and is open at the front and at the rear so as to give rise to a through hole 103 defined by a side wall 102 having a substantially hexagonal profile seen in cross section.

Figure 2:
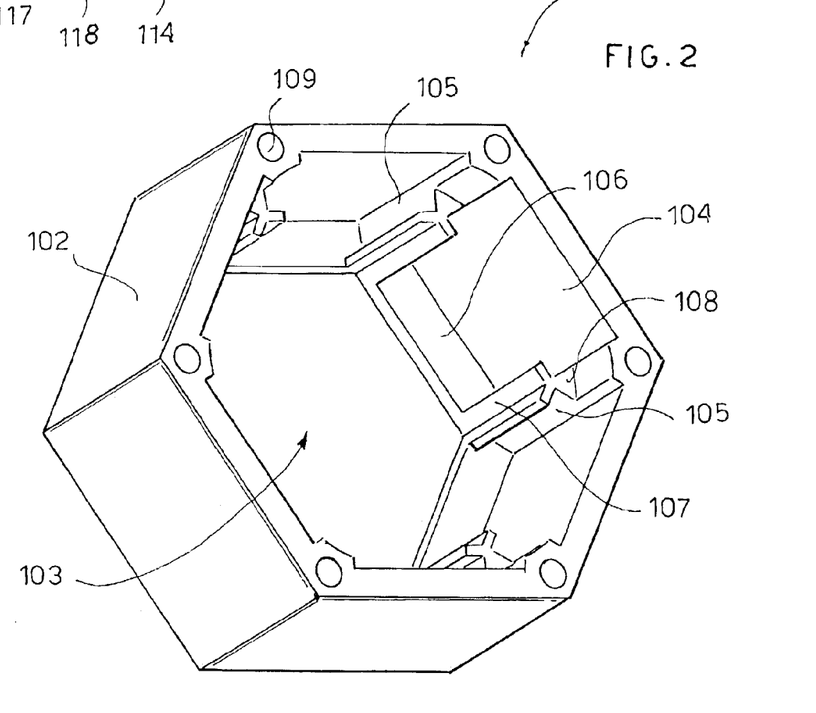
FIG. 2 is a perspective view, enlarged, illustrating the body of the adapter device of FIG. 1, taken from a different angle from FIG. 1.
Figure 3:
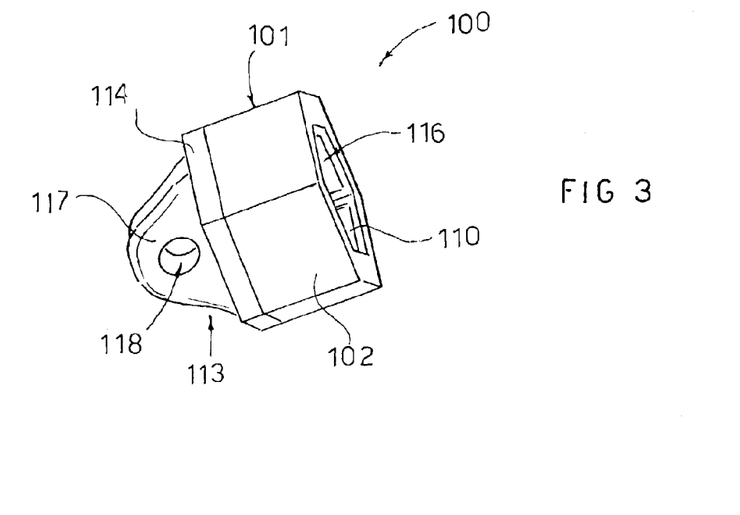
FIG. 3 is a perspective view, illustrating the adapter device of FIG. 1 assembled.

As shown better in FIG. 2, six rectangular seats 104 are defined in the inside surface of the side wall 102 of the body, one for each face of the side wall 102. Each rectangular seat 104 is defined by a substantially U-shaped frame formed by two guiding side bulkheads 105 and one front abutment bulkhead 106.

The side bulkheads 105 have inwardly protruding ribs 107. The ribs 107 have a substantially Y-shaped cross section and are cut transversally, so as to give rise to a rear abutment surface 108.

Holes 109 for pins with a longitudinal axis are provided in the rear edge of the side wall 102. The holes for pins 109 are preferably disposed in proximity to the six vertices of the rear edge of the side wall 102.

Returning to FIG. 1, the adapter device 100 comprises a group of magnets indicated as a whole with reference numeral 120. To be exact, the group of magnets 120 comprises six side magnets 110 and one rear magnet 112. Each side magnet 110 is shaped like a rectangular plate suitable to be housed inside a respective seat 104 of the body 101. In this manner, each side magnet plate 110 is guided by the side bulkheads 105 and the ribs 107 until the front edge of the magnetic plate 110 abuts against the front abutment bulkhead 106.

Figure 1:
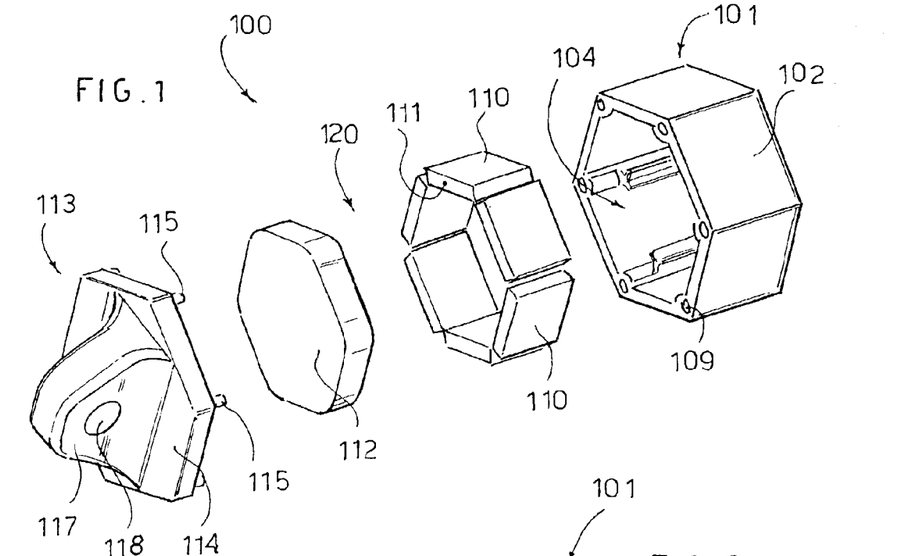
FIG. 1 is a perspective view, exploded, illustrating an adapter device according to a first embodiment of the invention.

The side magnetic plates 110 are of substantially the same length as the ribs 107. In this manner, when the side magnetic plates 110 are inside the respective seats 104, the extreme rear edge 111 of each side magnetic plate 110 is at the same level as the rear abutment surface 108 of the ribs 107.

The rear magnet 112 is shaped like a substantially hexagonal plate having such dimensions as to be able to be inserted into the body 101. In this manner the rear magnetic plate 112 abuts against the rear edges 111 of the side magnetic plates and against the abutment surfaces 108 of the ribs 107 of the body.

In particular, the side magnetic plates 110 are able to come into contact with the respective side faces of the head of a wheel mounting bolt, such as bolt with a hexagonal head. The rear magnetic plate 112, on the other hand is able to come into contact with the front face of the head of a wheel mounting bolt.

Lastly the adapter device 100 comprises a closing cover 113 suitable to be applied to the rear part of the body 101 to close the magnet assembly 120 inside the body 101.

The closing cover 113 comprises a rear closing plate 114 having a substantially hexagonal shape with a perimeter substantially similar to that of the rim of the side wall 102 of the body. A plurality of pins 115 able to press-engage in the holes 109 provided in the rear edge of the side wall 102 of the body are provided in the front surface of the closing plate 114.

Clearly the closing plate 114 can be fastened to the body 102 by means of other fastening means, such as welding, gluing and the like. Alternatively the closing plate 114 can be made in a single body with the body 101 and in this case the group of magnets 120 is fixed by means of suitable fastening means inside the body 101. According to yet another embodiment, the magnet assembly 120 can be incorporated into the body 101 and/or into the rear closing plate 114.

Clearly the magnet assembly 120 can comprise only one magnetic element or a different number of magnetic elements made in different shapes from those shown in the figures. The essential condition is represented by the fact that the magnet assembly 120 disposed inside the body 101 gives rise to a hole 116 (FIG. 3) able to receive the head of a fastening bolt, such as, for example, a bolt with a hexagonal head, generally used for mounting a wheel of a vehicle.

A flange 117 which protrudes rearward and has a transverse through hole 118 having an axis substantially parallel to the plane of the closing plate 114 is provided on the rear surface of the closing plate 114.

Figure 4:
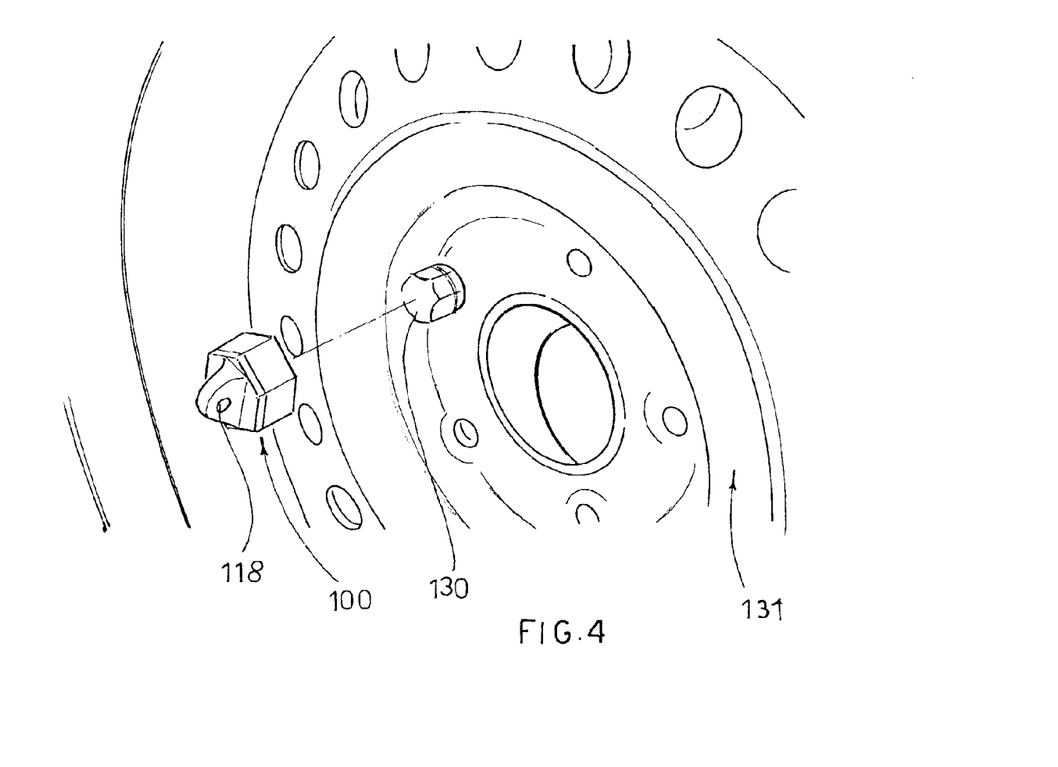
FIG. 4 is a perspective view, partially broken off, diagrammatically illustrating application of the adapter device of FIG. 3 to a wheel bolt of a vehicle.

As shown in FIG. 4, installation of the adapter device 100 is extremely simple. In fact, the user must manually take the adapter device 100 and apply it to the hexagonal head 130 of a fastening bolt used for mounting a wheel 131. Such operation requires neither the use of manual strength nor the use of special tools by the user.

It must be considered that the adapter device 100 has been designed for fastening snow chains connected to radial arms ending in a disc-shaped plate provided with a fastening bar. Consequently, the adapter device 100 must be mounted in such a manner that the axis of the hole 118 of the adapter device is directed towards the axis passing through the centre of the wheel rim. In this manner the hole 118 can receive the fastening bar connected to the disc-shaped plate of the radial arms of the snow chains.

In the adapter device 100, the magnet assembly 120 acts through a magnetic hold on the head 130 of the wheel bolt, which is metal, ensuring a firm grip of the adapter device 100. After various experimental tests, the applicant has ascertained that the magnetic retention exerted by the magnets 120 is sufficient to ensure the hold of the adapter device 100 on the head of the bolt 130, even when the vehicle is travelling.

Removal of the adapter device 100 also is extremely simple, in fact it is sufficient for the user to exert a manual pull thereon to overcome the magnetic retention force.

Figures 5, 6, 7:
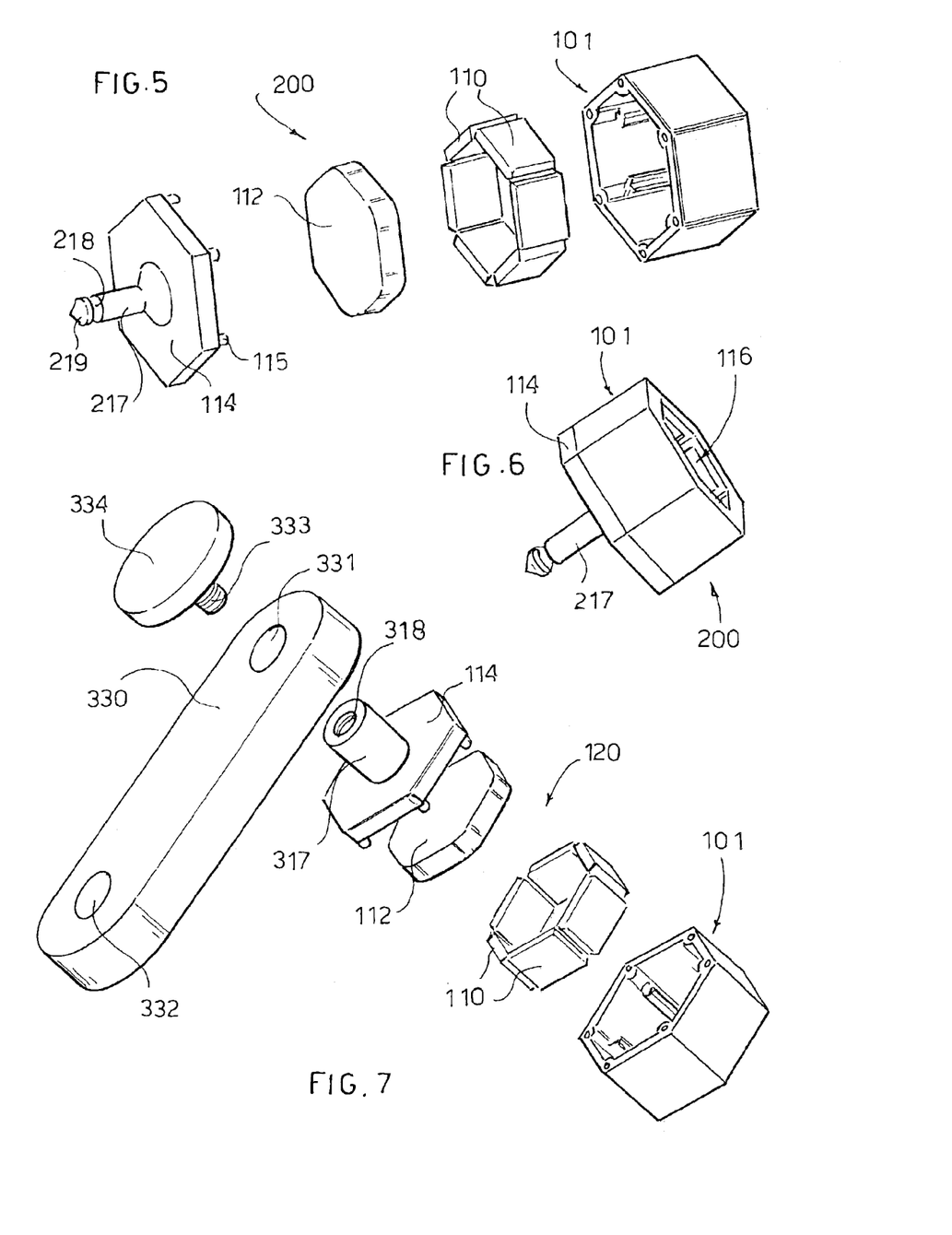
FIG. 5 is a perspective view, exploded, illustrating an adapter device according to a second embodiment of the invention.
FIG. 6 is a perspective view, illustrating the adapter device of FIG. 5 assembled.
FIG. 7 is a perspective view, exploded, illustrating an adapter device according to a third embodiment of the invention.

FIGS. 5 and 6 show a second embodiment of the adapter device designated as a whole with reference numeral 200. The only difference between the adapter device 100 and the adapter device 200 is represented by the fact that on the closing plate 144 of the adapter device 200, instead of the flange 117 being provided, a pin 217 is provided which protrudes forward therefrom in an axial direction. The pin 217 has an annular groove 218, disposed in proximity to its free end and the free end 219 of the pin 217 is substantially pointed.

The pin 217 is able to snap or press engage in a pivot hole formed in a special lever connected to the disc-shaped plate of the radial arms connected to the snow chain.

Figure 8:
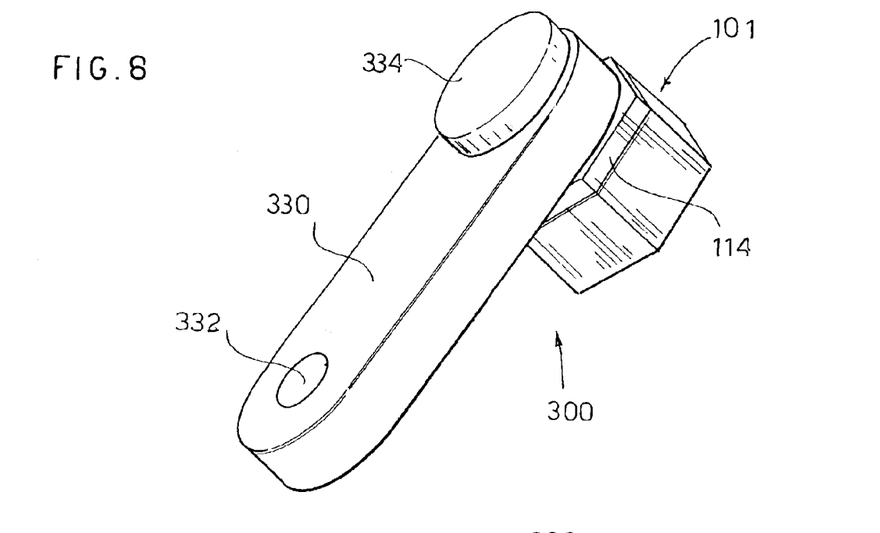
FIG. 8 is a perspective view illustrating the adapter device of FIG. 7 assembled.

FIGS. 7 and 8 show a third embodiment of an adapter advice designated as a whole with reference numeral 300. In the rear closing plate 114, a cylindrical tang 317 that protrudes rearward therefrom in an axial direction is provided. The cylindrical tang 317 has an axial hole 318 for a pin.

An engaging lever 330 has at one end a first through hole 331 and at the other end a second through hole 332. The first through hole 331 of the lever 330 is able to receive the cylindrical tang 317 of the closing plate 114, so that the axial hole 318 of the cylindrical tang 317 can be press or snap engaged by a pin 333 mounted on a button 334. In this manner the closing plate 114 is constrained to the lever 330 and the lever 330 can turn relatively with respect to the closing plate, around the axis of the tang 317 of the closing plate.

Figure 9:
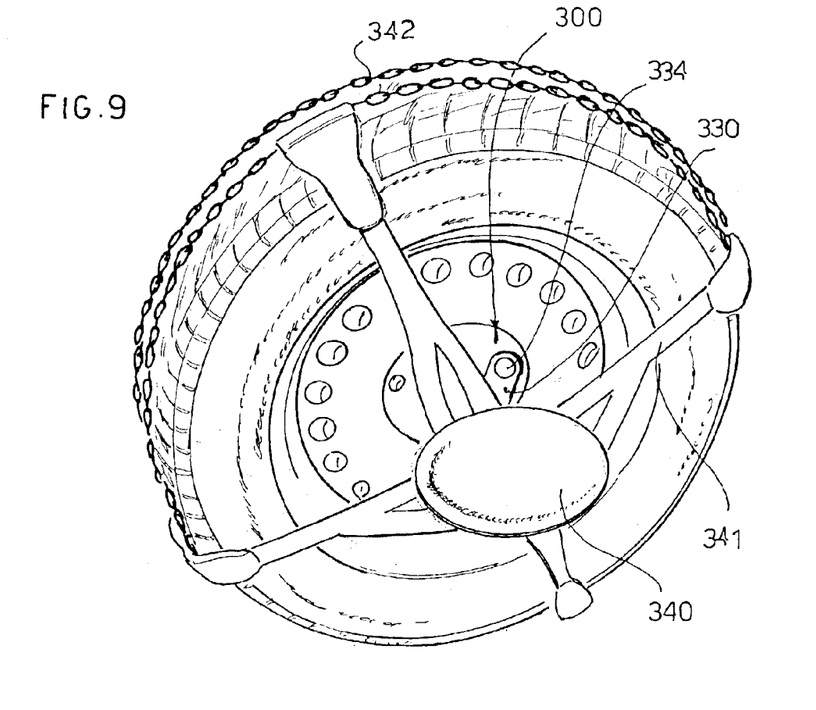
FIG. 9 is a perspective view, schematically illustrating application of a snow chain to the adapter device of FIG. 8.

As shown in FIG. 9, for installation of the adapter 300 it is sufficient to fit the body 101 of the adapter on the head of a wheel bolt. Then the second hole 332 of the lever 330 is engaged by a pin provided in the disc-shaped box 340 of the snow chains. The disc-shaped box 340 is connected to four radial arms 341 connected in turn to the sections of chain 342 disposed on the tyre tread of the wheel.

FIGS. 10–13 show a fourth embodiment of an adapter device designated as a whole with reference numeral 400. The adapter device 400 comprises a front plate 401 and a rear plate 402, both substantially disc-shaped.

Figure 10:
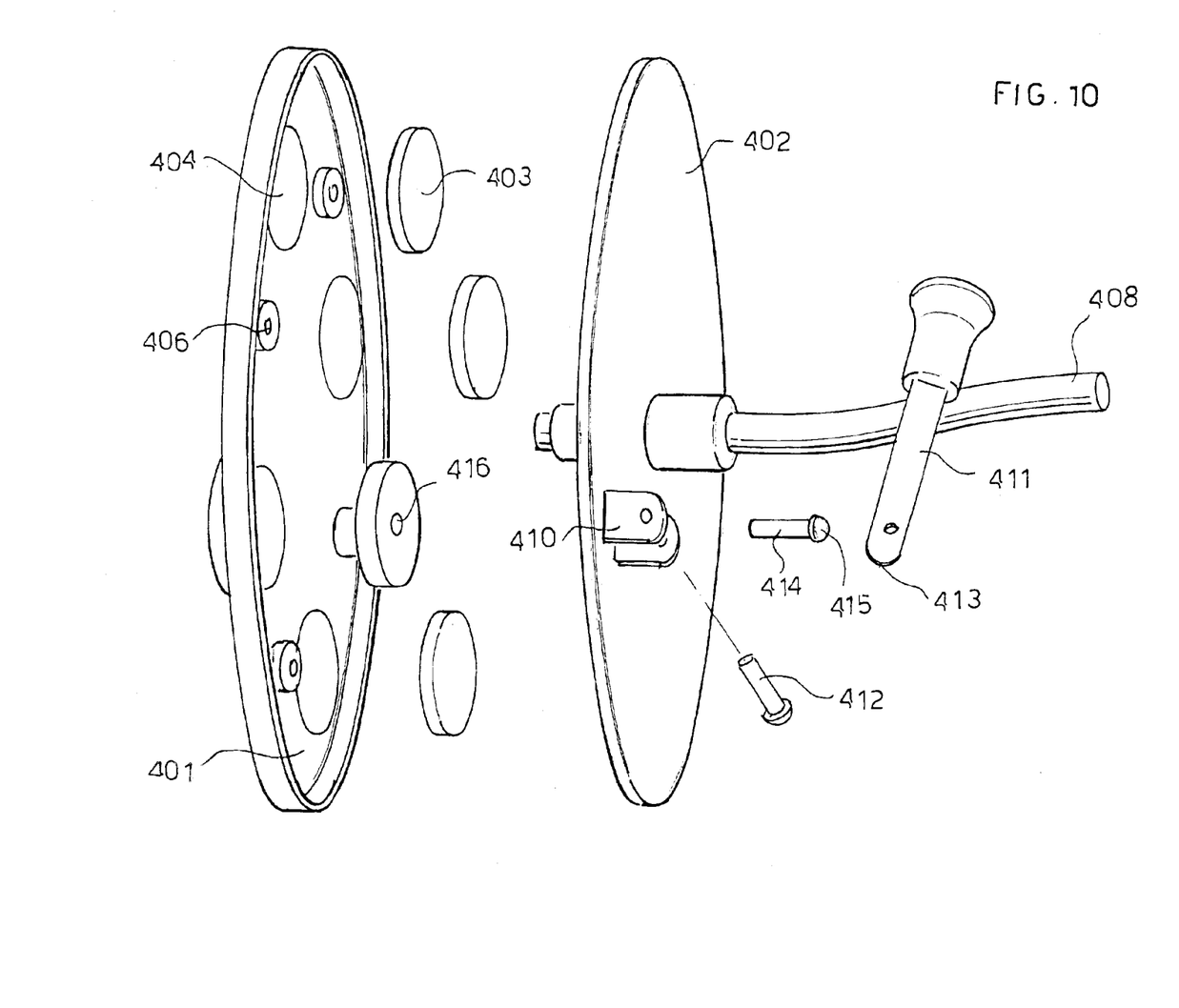
FIG. 10 is a perspective view, exploded, illustrating an adapter device according to a fourth embodiment of the invention.
Figures 11, 12, 13:
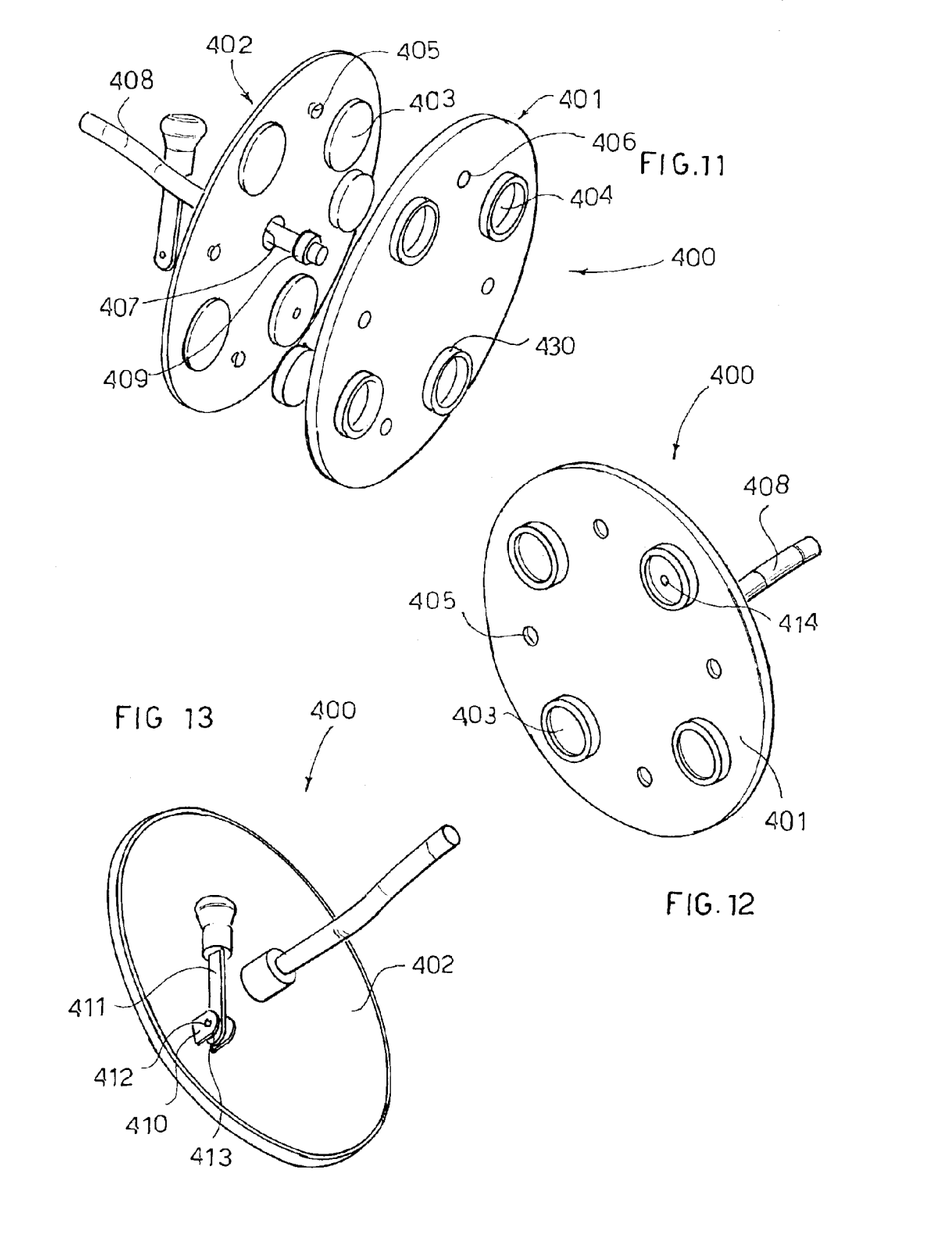
FIG. 11 is a perspective view, exploded, taken from a different angle from that of FIG. 10, illustrating the adapter device according to a fourth embodiment of the invention.
FIG. 12 is a perspective view, illustrating the adapter device of FIG. 10 assembled.
FIG. 13 is a perspective view, taken from a different angle with respect to FIG. 12, illustrating the adapter device of FIG. 10, assembled.

Four through holes 404 disposed in positions corresponding to the positions of the heads of the wheel mounting bolts of a vehicle are provided in the front plate 401. Respective housings able to receive respective magnets 403 shaped like a disc-shaped plate are formed in the rear surface of the front plate 401 around each hole 404. A cylindrical tang 430 having an inside diameter such as to be able to house the head of a wheel mounting nut of a vehicle is provided around each hole 104 in the front surface of each front plate 401.

The rear plate 402 has pins 405 able to engage in respective holes for pins 406 provided in the front plate 401. In this manner, when the two plates 401, 402 are assembled, the magnets 403 remain fixed in position in their seats.

In the rear plate, in a central position, a tang is formed with a through hole 407 wherein a tie-rod 408 blocked at one end by a ring 409 passes. The tie-rod 408 serves to fasten the adapter device 400 to the snow chains.

As shown better in FIGS. 10 to 13, an operating lever 411 is hinged by means of a transverse pin 412 to two supporting flanges 410 disposed in the rear surface of the rear plate 402. In this manner the operating lever 411 can turn around the axis of the pin 412.

The operating lever 411 has a rounded end surface 413 which acts as a cam. Between the flanges 410, a through hole is formed in the rear plate 402 which receives an operating pin 414 the rounded head 415 whereof cooperates with the cam-shaped end 413 of the operating lever 411.

Accordingly, one of the magnets 403 has, in a central position, a through hole 416 through which the operating pin 414 can pass. In this manner, when the operating lever 411 is in the resting position, that is to say, substantially parallel to the surface of the rear plate 402, the end of the operating pin 414 is retracted within the hole 416 of the magnet 403. On the other hand, when the operating lever 411 is in the operating position, that is to say substantially at right angles to the surface of the rear plate 402, the end of the operating pin 414 is extracted from the hole 416 of the magnet 403.

In this manner, for installation of the adapter device 400, the user applies said adapter device to the wheel bolts, so that the heads of the bolts are housed in the seats formed in the tangs 430 and are retained by the magnets 403.

When the adapter device 400 must be removed, the user operates the operating lever 411, bringing it into the working position, substantially at right angles to the surface of the rear plate 402. In this manner, the cam surface 413 of the operating lever 411 acts on the head of the pin 414. Consequently, the end of the pin 414 protrudes from the hole 416 of the magnet and pushes the head of the wheel bolt, causing detachment of the relative magnet 403 from the wheel bolt. In this manner the user, by exerting a minimum pulling force on the adapter device 400, succeeds in detaching it from the wheel bolts.

Although in FIGS. 10–13 four holes 404 which define four seats to receive four wheel bolts have been shown, a different number of holes 404 can be provided in the adapter device 400, such as for example even five holes 404 which define five seats to receive five wheel bolts.

Numerous variations and modifications of detail within the reach of person skilled in the art can be made to the present embodiments of the invention, without thereby departing from the scope of the invention, as set forth in the appended claims.

What is claimed is:

1. An adapter device (100; 200; 300; 400) for fastening snow chains to vehicle wheels, said adapter device being able to be applied on the head (130) of at least one wheel bolt and comprising a body whereon are provided connecting means suitable to be connected to connection and installation elements of snow chains, characterised in that said adapter device comprises magnetic means (120; 403) able to grip said head (130) of at least one wheel bolt, so as to firmly constrain the body of the adapter device to the wheel, by means of magnetic retention, characterised in that said adapter device comprises a body (101) shaped substantially like a hexagonal nut defining a seat (116) having a substantially hexagonal cross section to receive the head (130) of a wheel mounting bolt.

2. An adapter device (100; 200; 300) according to claim 1, characterised in that inside said body (101) of the adapter device lateral seats (104) are formed such as to receive respective substantially rectangular magnetic plates (110), destined to come into contact with respective lateral faces (130) of the head (130) of a wheel mounting bolt.

3. An adapter device (100; 200; 300) according to claim 2, characterised in that each lateral seat (104) is defined by a substantially U-shaped frame comprising two lateral guide bulkheads (105) and a front abutment bulkhead (106).

4. An adapter device (100; 200; 300) according to claim 3, characterised in that on each side bulkhead (105) a rib (107) is formed, having a substantially Y-shaped cross section and defining a rear abutment surface (108).

5. An adapter device (100; 200; 300) according to claim 4, characterised in that it comprises a rear magnetic plate (112), substantially hexagonal in shape, disposed on the rear edge of said lateral magnetic plates (110) and on said abutment surface (108) of said ribs (107) and destined to come into contact with the front surface of the head (130) of a wheel mounting bolt.

6. An adapter device (100; 200; 300) according to claim 1, characterised in that said body (101) has a rear closing plate (114) whereon are mounted said connecting means of the snow chains.

7. An adapter device (100; 200; 300) according to claim 6, characterised in that on the inner surface of said closing plate (114) there are provided pins (115) able to engage in respective holes (109) disposed in said body (101).

8. An adapter device (100) according to claim 6, characterised in that on the outer surface of said rear closing plate (114) there is provided a flange (117) provided with a hole (118) with a transverse axis suitable to receive a bar for fastening of the snow chains.

9. An adapter device (200) according to claim 6, characterised in that on the outer surface of said rear closing plate (114) there is provided a pin (217) protruding axially outward to engage with a connecting element for fastening of the snow chains.

10. An adapter device (300) according to claim 6, characterised in that on the outer surface of said rear closing plate (114) there is provided a cylindrical tang (317) protruding axially outward whereon is rotatably mounted a bar (330) provided with a hole (332) for connection to a fastening element of the snow chains.

11. An adapter device (300) according to claim 10, characterised in that said cylindrical tang (317) of the rear closing plate (114) has a hole (317) able to receive a pin (333) of a button (334) destined to be disposed on said bar (330).

12. An adapter device (100; 200; 300; 400) for fastening snow chains to vehicle wheels, said adapter device being able to be applied on the head (130) of at least one wheel bolt and comprising a body whereon are provided connecting means suitable to be connected to connection and installation elements of snow chains, characterised in that said adapter device comprises magnetic means (120; 403) able to grip said head (130) of at least one wheel bolt, so as to firmly constrain the body of the adapter device to the wheel, by means of magnetic retention, characterised in that said body comprises a disc-shaped front plate (401) and a disc-shaped rear plate (402) which can be assembled with one another, there being provided in said front plate (401) a plurality of seats able to receive respective magnetic plates (403), said seats of the magnets being disposed in register with the positions of the heads of the bolts of a wheel.

13. An adapter device (400) according to claim 12, characterised in that a tie-rod (408) is connected to said rear plate (402) for connection to an installation element of said snow chains.

14. An adapter device (400) according to claim 12, characterised in that in said rear plate (402) there is mounted a manual operating lever (411) which acts on a pin (414) that passes through one of said magnetic plates (403) to abut against the head of a wheel bolt so as to cause detachment of the relative magnetic plate from the corresponding head of the wheel bolt.

15. An adapter device (100; 200; 300; 400) for fastening a snow chain to a vehicle wheel having at least one wheel bolt, said adapter device being constructed to be applied on the head (130) of the wheel bolt and comprising a body with connecting means on the outer portion thereof constructed to be connected to the connection and installation elements of snow chains, characterised in that said adapter device body comprises an inner recessed portion with magnetic means (120; 403) for receiving and gripping said head (130) of the wheel bolt, by means of magnetic retention, so as to removably retain the body of the adapter device on the wheel.

* * * * *